G. F. DICKSON.
COATING MACHINE.
APPLICATION FILED FEB. 26, 1915.
1,215,305.
Patented Feb. 6, 1917.
3 SHEETS—SHEET 1.
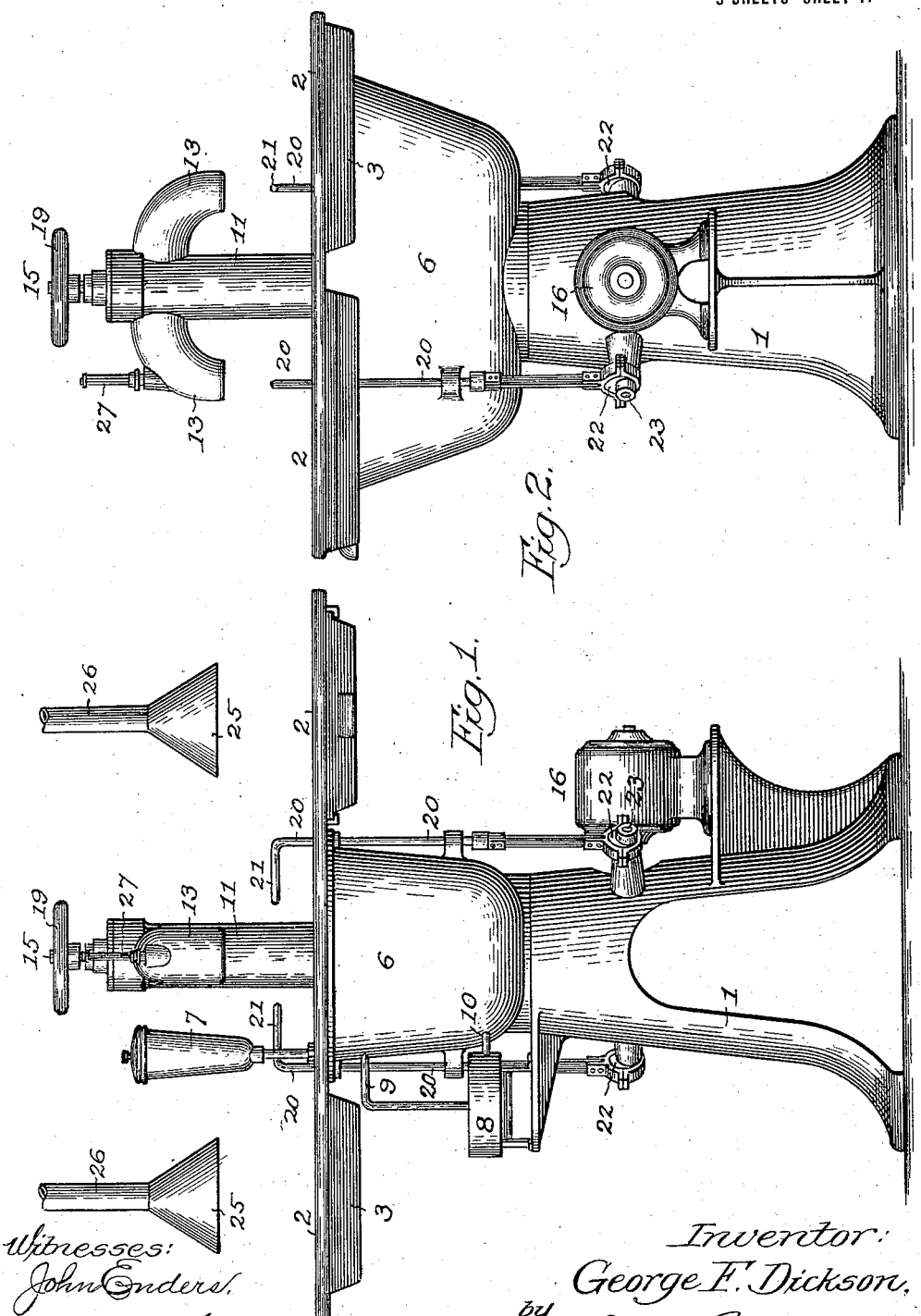
Inventor:
George F. Dickson,
by Robert Burns,
Atty.

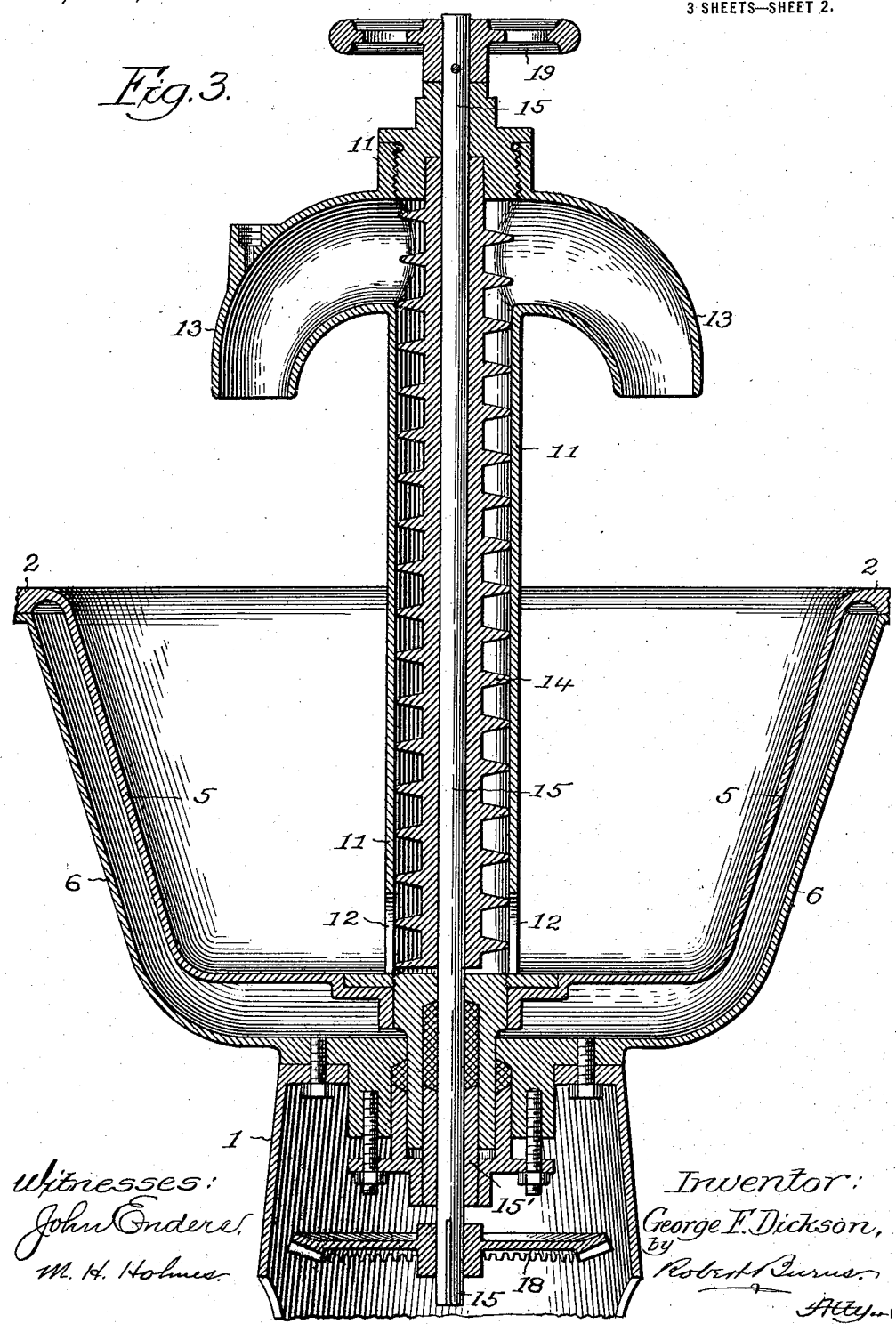

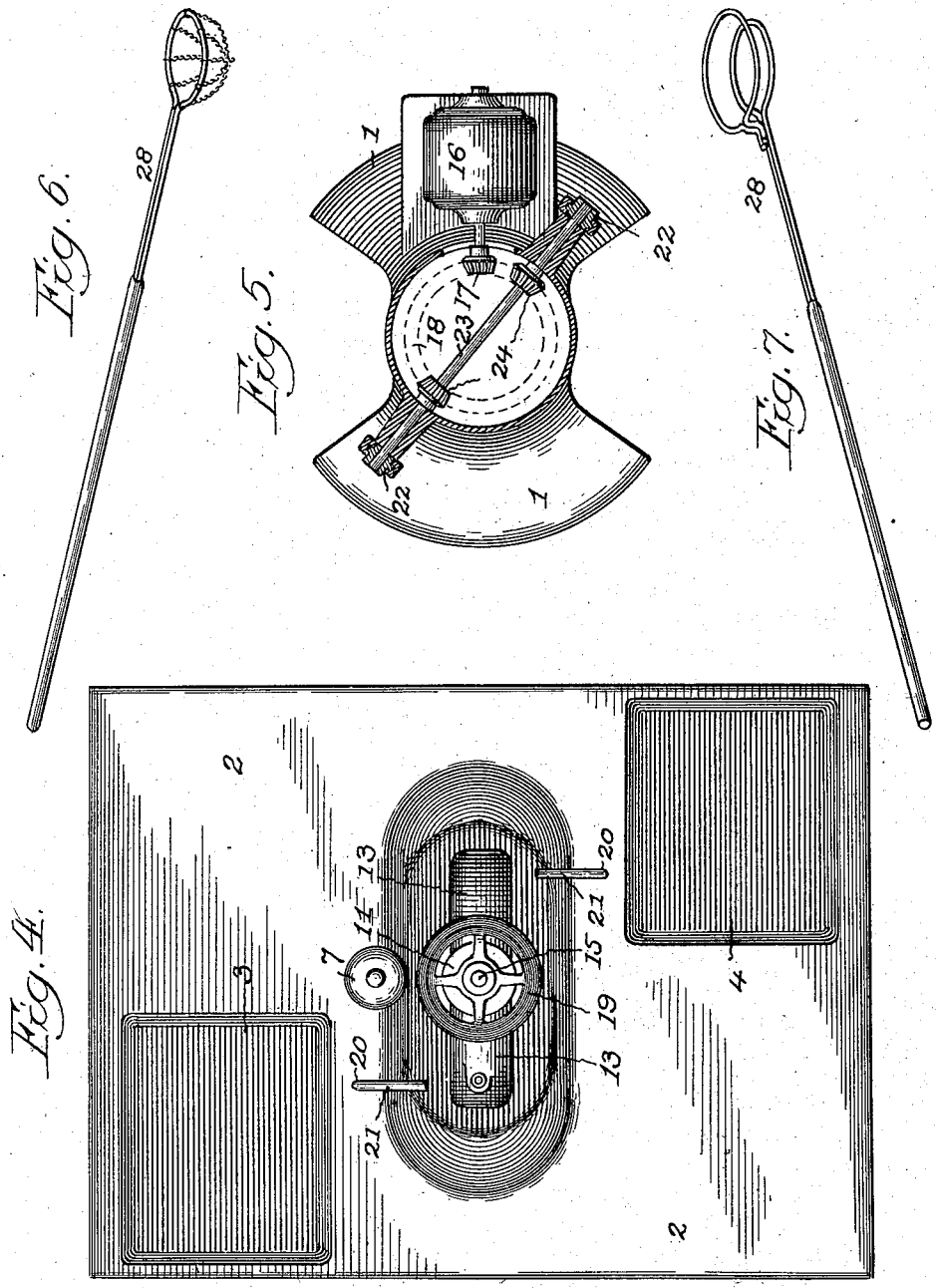

UNITED STATES PATENT OFFICE.

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

COATING-MACHINE.

1,215,305.   Specification of Letters Patent.   Patented Feb. 6, 1917.

Application filed February 26, 1915. Serial No. 10,712.

*To all whom it may concern:*

Be it known that I, GEORGE F. DICKSON, a citizen of the United States of America, and a resident of Chicago, in the county of Cook, State of Illinois, have invented certain new and useful Improvements in Coating-Machines, of which the following is a specification.

This invention relates more particularly to that class of coating machines in which chocolate or like coating material in a heated state is expeditiously applied to the candy or other centers of confections.

And the present improvement has for its object to provide a simple structural formation and association of parts whereby a flowing stream of the fluid and heated chocolate, or like coating material, is utilized to apply the required coating to the candy or other center supported in position by a holding ladle or basket in the hand of the operator.

A further object is to provide a simple arrangement of jarring mechanism operating in unison with the other mechanisms of the apparatus, and adapted to jar or shake off the surplus amount of coating material from the freshly coated confection, in a rapid and efficient manner.

Another object is to provide means whereby the coated articles are efficiently cooled immediately subsequent to the coating operation. All as will hereinafter more fully appear.

In the accompanying drawings:—

Figure 1 is a front elevation of a machine adapted for the use of two individual operatives.

Fig. 2 is a side elevation of the same.

Fig. 3 is an enlarged detail vertical section of the melting pot and its pumping accessories.

Fig. 4 is a top view of the machine shown in Figs. 1 and 2.

Fig. 5 is a horizontal section through the base of the machine, and illustrating the motor and gearing connections thereof.

Figs. 6 and 7 are detail perspective views of two types of the skeleton holding ladles for the centers to be coated.

Similar reference numerals indicate like parts in the several views.

Referring to the drawings, 1 designates the supporting base or standard of any usual form, and upon which is supported at the proper height the flat work table or bench top 2, which in the construction shown is formed with the usual counterpart shallow recesses or trays 3 and 4, at diagonal corners, for holding a quantity of the centers or articles to be coated, and with the usual central and sunken melting pot or chamber 5, for containing a supply of the heated material used in the coating operation.

6 designates a casing or jacket surrounding the melting pot 5, and forming in connection with the side walls and bottom of said pot, a closed chamber adapted to contain a filling of water or like liquid from which heat is transferred to the contents of said melting pot.

7 designates an elevated tank or reservoir associated with the water chamber above described, and adapted to maintain the same in a filled condition.

8 designates a heater casing of an electrically heated or other suitable type, connected by circulating pipes 9 and 10 with the aforesaid water chamber which incloses the melting pot 5, and adapted to maintain a regulatable temperature in the melted contents of said pot.

11 designates a pump casing, preferably of the upright tubular form shown, and arranged centrally in the melting pot 5. The lower end of said pump casing is formed with openings 12 communicating with the bottom portion of the interior of the melting pot 5, while its upper portion extends a distance above said pot and the plane of the table top 2, and is provided with one or more downturned discharge nozzles 13, preferably, two in number, as shown.

14 designates a movable pump member associated with the pump casing 11, and preferably consisting of a revolving screw or propeller, the carrying shaft 15 of which extends out through the closed top of the pump casing 11, while the lower end of said shaft extends down through a packing gland 15' on the bottom of the melting pot 5 for operative connections hereinafter described.

16 designates a driving motor, preferably of the electric type shown, mounted on the base or standard 1, with its shaft provided with a bevel pinion 17 having driving engagement with a bevel wheel 18 on the propeller shaft 15 and adapted to impart continued rotation to the same in the continued operation of the apparatus.

19 designates a handle or hand wheel attached to the upper end of the carrying shaft 15 of the propeller 14 and adapted to provide a convenient means for the manual rotation of said propeller to free the same when the coating material within the pump casing is so adherent as to prevent the normal rotation of the propeller, such for instance as in an initial starting up of the apparatus.

20 designates counterpart jarring members, each preferably comprising a vertically reciprocating stem having a laterally extending arm 21 at its upper end, while its lower end is operatively connected to the yoke of an operating eccentric 22.

23 designates counterpart shafts journaled on the base or standard 1, and carrying on their outer ends the aforesaid eccentrics 22, and on their inner ends bevel pinions 24 having operative engagement with the bevel wheel 18 aforesaid, and adapted to receive rapid rotation therefrom.

25 designates counterpart discharge hoods disposed above the portion of the table or bench top 2, which receives the coated articles after the same have passed through the coating operation. Said hoods have pipe connections 26 with a suitable source of cold air supply, and as so arranged and connected the said hoods are adapted to produce very effective local cooling zones for the freshly coated articles, and dispense with the usual temperature regulation of the entire room and which has heretofore been the usual practice.

27 designates a thermometer, or like temperature indicating appliance, associated with one of the outlet nozzles 13, aforesaid, to indicate to the operator any undue increase or reduction in the temperature of the molten coating material, and so that the operator may correctly change and regulate the heat.

28 designates handled skeleton of a usual and suitable detail construction, adapted to hold the centers or articles to be coated.

The operation of the apparatus is as follows:—

With the mechanisms of the apparatus in motion and the propeller 14 in rotation, a constant stream of the molten coating material is forced upward through the pump casing 11, and discharged in a downward direction through the downturned discharge nozzles 13 of the apparatus. The operator places the centers or articles to be coated in skeleton holding ladles 28, and serially exposes the centers or articles so held in the downward flow of heated coating material, after which the handle of the holding ladle 28 is held upon an arm 21 of the jarring mechanism 20 from which the said ladle and its contents receives a rapid vibration to cause the surplus coating material to be shanken off, back into the melting pot 5. The coated article is then emptied from its holding ladle 28 onto the table top 2, and beneath a discharge hood 25 to be cooled, after which the coated article may be removed to the packing room or to a place of storage.

Having thus fully described my said invention what I claim as new and desire to secure by Letters Patent, is:—

1. In a coating apparatus, the combination of an open top melting pot, a fixed work table projecting laterally from the margin of said pot, and a pump associated with said pot and adapted to effect a flow of a stream of the fluid contents of the pot in a downward direction back into the pot, substantially as set forth.

2. In a coating apparatus, the combination of an open top melting pot, a fixed table projecting laterally from the margin of said pot, a pump associated with said pot and adapted to effect a flow of a stream of the fluid contents of the pot in a downward direction back into the pot, and a jarring means extending vertically through the work table adjacent to the margin of the pot, substantially as set forth.

3. In a coating apparatus, the combination of an open top melting pot, a fixed table projecting laterally from the margin of said pot, a pump associated with said pot and adapted to effect a flow of a stream of the fluid contents of the pot in a downward direction back into the pot, and a discharge head located above the table aforesaid and adapted to discharge a cooling medium thereon, substantially as set forth.

4. In a coating apparatus, the combination of an open top melting pot, a fixed table projecting laterally from the margin of said pot, a pump associated with said pot and adapted to effect a flow of a stream of the fluid contents of the pot in a downward direction back into the pot, a jarring means extending vertically through the work table adjacent to the margin of the pot, and a discharge head located above said table and adapted to discharge a cooling medium thereon, substantially as set forth.

5. In a coating apparatus, the combination of an open top melting pot, a heating jacket surrounding said pot, a heating member having circulatory connection with said heating jacket, a fixed table projecting laterally from the margin of said pot, and a pump associated with said pot and adapted to effect a flow of a stream of the melted contents of the pot in a downward direction back into the pot, substantially as set forth.

6. In a coating apparatus, the combination of an open top melting pot, a heating jacket surrounding said pot, a heating member having circulatory connection with said heating jacket, a fixed table projecting laterally from the margin of said pot, and a jarring means extending vertically through the work table adjacent to the margin of the pot, substantially as set forth.

7. In a coating apparatus, the combination of an open top melting pot, a heating jacket surrounding said pot, a heating member having circulatory connection with said heating jacket, a fixed table projecting laterally from the margin of said pot, and a discharge head located above the table aforesaid and adapted to discharge a cooling medium thereon, substantially as set forth.

8. In a coating apparatus, the combination of an open top melting pot, a heating jacket surrounding said pot, a heating member having circulatory connection with said heating jacket, a fixed table projecting laterally from the margin of said pot, a jarring means extending vertically through the work table adjacent to the margin of the pot, and a discharge head located above said table and adapted to discharge a cooling medium thereon, substantially as set forth.

9. In a coating apparatus, the combination of an open top melting pot, means for heating the same, a fixed work table projecting laterally from the margin of said pot, a pump casing arranged centrally in said pot with its upper end extended above the pot and provided with a plurality of lateral downturned discharge nozzles, a propeller associated with said pump casing, and means for operating said propeller, substantially as set forth.

10. In a coating apparatus, the combination of an open top melting pot, means for heating the same, a fixed work table projecting laterally from the margin of said pot, a pump casing arranged centrally in said pot with its upper end extended above the pot and provided with a plurality of lateral downturned discharge nozzles, a propeller associated with said pump casing, means for operating said propeller, and a jarring means extending vertically through the work table adjacent to the margin of the pot, substantially as set forth.

11. In a coating apparatus, the combination of an open top melting pot, means for heating the same, a fixed work table projecting laterally from the margin of said pot, a pump casing arranged centrally in said pot with its upper end extended above the pot and provided with a plurality of lateral downturned discharge nozzles, a propeller associated with said pump casing, means for operating said propeller, and a discharge head located above the table aforesaid and adapted to discharge a cooling medium thereon, substantially as set forth.

12. In a coating apparatus, the combination of an open top melting pot, means for heating the same, a fixed work table projecting laterally from the margin of said pot, a pump casing arranged centrally in said pot with its upper end extended above the pot and provided with a plurality of lateral downturned discharge nozzles, a propeller associated with said pump casing, means for operating said propeller, a jarring means extending vertically through the work table adjacent to the margin of the pot, and a discharge head located above said table and adapted to discharge a cooling medium thereon, substantially as set forth.

13. In a coating apparatus, the combination of a melting pot, means for heating the same, a pump casing arranged centrally in said pot with its upper end extending above the pot and provided with a plurality of downturned discharge nozzles, a propeller associated with said pump casing and having an operating shaft extending down through the bottom of the melting pot, a motor operatively connected to the lower end of said shaft, and a table associated with said melting pot and pump casing for the support of the coated and uncoated articles substantially as set forth.

14. In a coating apparatus, the combination of a melting pot, means for heating the same, a pump casing arranged centrally in said pot with its upper end extending above the pot and provided with a plurality of downturned discharge nozzles, a propeller associated with said pump casing and having an operating shaft extending down through the bottom of the melting pot, a motor operatively connected to the lower end of said shaft, a table associated with said melting pot and pump casing for the support of the coated and uncoated articles, and jarring means located at the margin of the melting pot, substantially as set forth.

15. In a coating apparatus, the combination of a melting pot, means for heating the same, a pump casing arranged centrally in said pot with its upper end extending above the pot and provided with a plurality of downturned discharge nozzles, a propeller associated with said pump casing and having an operating shaft extending down through the bottom of the melting pot, a motor operatively connected to the lower end of said shaft, a table associated with said melting pot and pump casing for the support of the coated and uncoated articles, and discharge heads located above portions of the table and adapted to discharge cooling mediums thereon, substantially as set forth.

16. In a coating apparatus, the combination of a melting pot, means for heating the same, a pump casing arranged centrally in said pot with its upper end extending above the pot and provided with a plurality of downturned discharge nozzles, a propeller associated with said pump casing and having an operating shaft extending up through the top of the pump casing and down through the bottom of the melting pot, an operating means carried on the upper end of said shaft, a motor operatively connected to the lower end of said shaft, and a table associated with said melting pot and pump casing for the support of the coated and uncoated, articles, substantially as set forth.

17. In a coating apparatus, the combination of a melting pot, means for heating the same, a pump casing arranged centrally in said pot with its upper end extending above the pot and provided with a plurality of downturned discharge nozzles, a propeller associated with said pump casing and having an operating shaft extending up through the top of the pump casing and down through the bottom of the melting pot, an operating means carried on the upper end of said shaft, a motor operatively connected to the lower end of said shaft and a table associated with said melting pot and pump casing for the support of the coated and uncoated articles, and jarring means located at the margin of the melting pot, substantially as set forth.

18. In a coating apparatus, the combination of a melting pot, means for heating the same, a pump casing arranged centrally in said pot with its upper end extending above the pot and provided with a plurality of downturned discharge nozzles, a propeller associated with said pump casing and having an operating shaft extending up through the top of the pump casing and down through the bottom of the melting pot, an operating means carried on the upper end of said shaft, a motor operatively connected to the lower end of said shaft, a table associated with said melting pot and pump casing for the support of the coated and uncoated articles, and discharge heads located above portions of the table and adapted to discharge cooling mediums thereon, substantially as set forth.

19. In a coating apparatus, the combination of a melting pot, a pump associated with said pot and adapted to effect a flow of a stream of the melted contents of the pot in a downward direction, a table associated with said melting pot and pump for the support of the coated and uncoated articles, and a jarring means located at the margin of said pot and comprising a vertical stem having a lateral arm at its upper end and at its lower end a yoke connection with an operating eccentric, substantially as set forth.

20. In a coating apparatus, the combination of a melting pot, a heating jacket surrounding said pot, a heating member having circulatory connections with said heating jacket, a pump associated with said melting pot and adapted to effect a flow of a stream of the melted contents of the pot in a downward direction, a table associated with said melting pot and pump for the support of the coated and uncoated articles, and a jarring means located at the margin of said pot and comprising a vertical stem having a lateral arm at its upper end and at its lower end a yoke connection with an operating eccentric, substantially as set forth.

21. In a coating apparatus, the combination of a melting pot, means for heating the same, a pump casing arranged centrally in said pot with its upper end extending above the pot and provided with a plurality of downturned discharge nozzles, a propeller associated with said pump casing, means for operating said propeller, a table associated with said melting pot and pump casing for the support of the coated and uncoated articles, and jarring means located at the margin of said pot and each comprising a vertical stem having a lateral arm at its upper end and at its lower end a yoke connection with an operating eccentric, substantially as set forth.

22. In a coating apparatus, the combination of a melting pot, means for heating the same, a pump casing arranged centrally in said pot with its upper end extending above the pot and provided with a plurality of downturned discharge nozzles, a propeller associated with said pump casing and having an operating shaft extending down through the bottom of the melting pot, a motor operatively connected to the lower end of said shaft, a table associated with said melting pot and pump casing for the support of the coated and uncoated articles, and jarring means located at the margin of said pot and each comprising a vertical stem having a lateral arm at its upper end and at its lower end a yoke connection with an operating eccentric, substantially as set forth.

23. In a coating apparatus, the combination of a melting pot, means for heating the same, a pump casing arranged centrally in said pot with its upper end extending above the pot and provided with a plurality of downturned discharge nozzles, a propeller associated with said pump casing and having an operating shaft extending up through the top of the pump casing and down through the bottoms of the melting pot, an operating means carried on the upper end of said shaft, a motor operatively connected to the lower end of said shaft, a table associated with said melting pot and pump casing for the support of the coated and uncoated articles, and jarring means located at the margin of said pot and each comprising a vertical stem having a lateral arm at its upper end and at its lower end a yoke connection with an operating eccentric, substantially as set forth.

Signed at Chicago, Illinois, this 24th day of February, 1915.

GEORGE F. DICKSON.

Witnesses:
  ROBERT BURNS,
  IVA L. CRANE.

Copies of this patent may be obtained for five cents each, by addressing the "Commissioner of Patents, Washington, D. C."